United States Patent
Izdepski

(10) Patent No.: US 8,229,479 B1
(45) Date of Patent: Jul. 24, 2012

(54) SYSTEMS AND METHODS FOR MULTIMEDIA MESSAGING

(75) Inventor: Erich J. Izdepski, Falls Church, VA (US)

(73) Assignee: Nextel Communications, Inc., Reston, VA (US)

( * ) Notice: Subject to any disclaimer, the term of this patent is extended or adjusted under 35 U.S.C. 154(b) by 1319 days.

(21) Appl. No.: 11/438,601

(22) Filed: May 23, 2006

(51) Int. Cl.
*H04W 4/00* (2009.01)

(52) U.S. Cl. .......... 455/466; 455/412.1; 455/412.2; 455/414.1; 455/458; 370/349; 370/351; 370/352; 370/389; 379/88.08; 379/88.11; 379/88.12; 379/88.13

(58) Field of Classification Search ............ 455/412.1, 455/412.2, 414.1, 466, 459, 458; 709/201, 709/202, 203, 204, 206, 207, 230, 231, 237; 370/329, 338, 352, 349, 351, 389; 379/88.08, 379/88.09, 88.11, 88.12, 88.13, 88.17, 93.24
See application file for complete search history.

(56) References Cited

U.S. PATENT DOCUMENTS

| | | | |
|---|---|---|---|
| 6,678,361 B2 * | 1/2004 | Rooke et al. | 379/93.24 |
| 6,865,191 B1 * | 3/2005 | Bengtsson et al. | 370/475 |
| 6,885,870 B2 | 4/2005 | Aho | |
| 6,947,738 B2 | 9/2005 | Skog et al. | |
| 7,088,993 B2 * | 8/2006 | Dumont et al. | 455/412.2 |
| 7,184,786 B2 * | 2/2007 | Mumick et al. | 455/466 |
| 7,212,807 B2 * | 5/2007 | Laumen et al. | 455/412.1 |
| 7,221,936 B2 * | 5/2007 | Purdy et al. | 455/417 |
| 7,519,379 B2 * | 4/2009 | Goertz et al. | 455/466 |
| 7,729,301 B2 * | 6/2010 | Salmi | 370/310 |
| 2002/0078228 A1 * | 6/2002 | Kuisma et al. | 709/237 |
| 2003/0095540 A1 | 5/2003 | Mulligan et al. | |
| 2003/0172121 A1 * | 9/2003 | Evans et al. | 709/206 |
| 2003/0172173 A1 * | 9/2003 | Fenton | 709/231 |
| 2003/0227916 A1 * | 12/2003 | Paila et al. | 370/390 |
| 2004/0120311 A1 * | 6/2004 | Marsot et al. | 370/352 |
| 2004/0148400 A1 * | 7/2004 | Mostafa | 709/227 |
| 2004/0153513 A1 * | 8/2004 | Laumen et al. | 709/206 |
| 2004/0209631 A1 * | 10/2004 | Park | 455/466 |
| 2005/0266831 A1 * | 12/2005 | Roth | 455/412.1 |
| 2006/0089164 A1 * | 4/2006 | Lee | 455/466 |
| 2006/0173965 A1 * | 8/2006 | Yang | 709/206 |
| 2006/0195505 A1 * | 8/2006 | Jerbi et al. | 709/203 |
| 2006/0195506 A1 * | 8/2006 | Deng | 709/203 |
| 2007/0066283 A1 * | 3/2007 | Haar et al. | 455/412.2 |

FOREIGN PATENT DOCUMENTS

WO   WO 2004068878 A1 * 8/2004

OTHER PUBLICATIONS

Multimedia Messaging Service, Encapsulation Protocol, Candidate Version 1.3—Sep. 27, 2005, Open Mobile Alliance OMA-TS-MMS-ENC-V1_3-20050927-C, 2005 Open Mobile Alliance Ltd., pp. 1-35.

Multimedia Messaging Service, pp. 1-4 downloaded from Wikipedia, on Apr. 27, 2006 from http://en.wikipedia.org/wiki/Multimedia_Messaging_System.

* cited by examiner

*Primary Examiner* — Olumide T Ajibade Akonai

(57) ABSTRACT

Systems and methods for multimedia messaging are provided. When a multimedia messaging service center (MMS-C) receives an MMS message for an intended recipient, the MMS-C forms an MMS notification message that includes the MMS message. The MMS-C then sends the MMS notification message to an intended recipient independent of receipt of a retrieval request from the recipient.

14 Claims, 6 Drawing Sheets

SYSTEMS AND METHODS FOR MULTIMEDIA MESSAGING

BACKGROUND OF THE INVENTION

Wireless communications systems have advanced from simple pager-type systems to integrated voice and data systems. These integrated voice and data systems originally provided text messaging between mobile stations using short message service (SMS). SMS messages are transmitted using signaling system 7 (SS7) within the Global System for Mobile Communications (GSM) mobile application part (MAP) framework, and therefore are limited to 140 bytes.

As the processing power of mobile stations increased there was a desire to send messages that are longer than 140 bytes and include images, audio and/or video. To address this need the 3rd Generation Partnership Project (3GPP) standardized multimedia messaging (MMS), which has been adopted by the Open Mobile Alliance (OMA). Due to the potential for large-sized messages, this standard defined a three step process for delivery of MMS messages, which is illustrated in FIG. 1. After receiving an MMS message from message initiator 105, MMS center (MMS-C) 110 sends an MMS notification message to the intended recipient 120 via push gateway 115. Intended recipient 120 replies with a MMS retrieval request message, and then MMS-C 110 sends the MMS message to intended recipient 120. In addition to being able to exchange larger messages than with SMS, MMS is designed to work in internet protocol (IP) networks. It is envisioned that the next generation wireless networks will include an all-IP core network.

SUMMARY OF THE INVENTION

In accordance with exemplary embodiments of the present invention, an MMS notification message is used to deliver the MMS message. Accordingly, unlike conventional systems which require three messages for delivery of the actual MMS message to the intended recipient, the present invention can deliver the MMS message using a single message. This reduces the load on the network, and in particular, conserves precious air interface resources.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
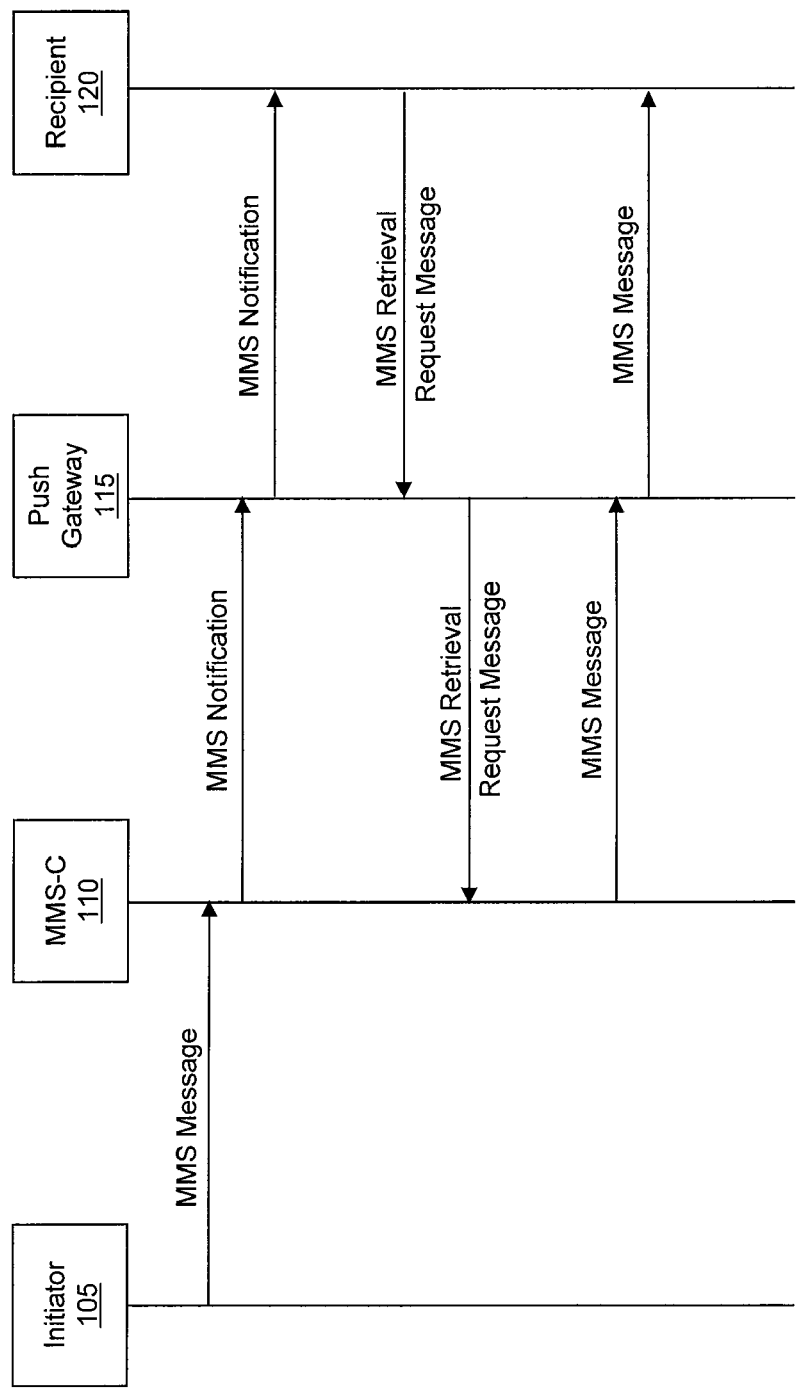
FIG. 1 is a signaling flow diagram of a conventional method for delivering MMS messages.
Figure 2:
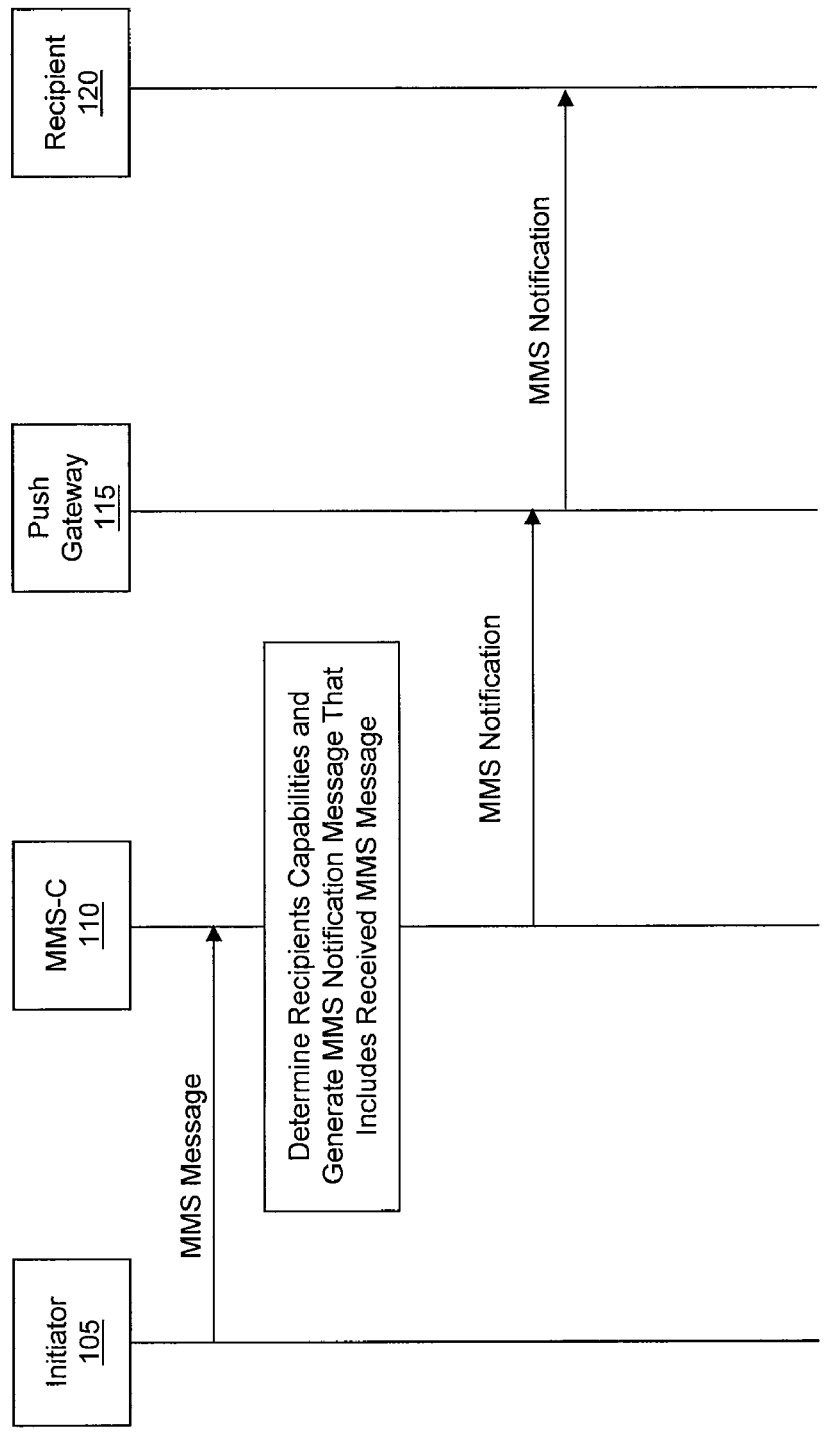
FIG. 2 is a signaling flow diagram of an exemplary method for delivering MMS messages in accordance with the present invention.

FIG. 2 is a signaling flow diagram of an exemplary method for delivering MMS messages in accordance with the present invention. Initially message initiator 105 sends an MMS message to MMS-C 110. Message initiator 105 can be a mobile station (e.g., a wireless telephone, personal digital assistant and/or the like) or a fixed station (e.g., a computer employing a dedicated messaging application or via web-based interface).

MMS-C 110 determines the capabilities of recipient 120 and generates an MMS notification message that includes the MMS message. Specifically, the MMS-C removes the payload portion of the MMS message and includes it in the MMS notification message. MMS-C 110 then sends the MMS notification message to push gateway 115. Push gateway 115 looks up the network address of message recipient 120 (e.g., using the telephone number of the recipient), and sends the message to recipient 120. When recipient 120 is a mobile station the message can be sent using over-the-air hyper-text-transfer protocol (OTA-HTTP) for recipients with an HTTP push router, or can employ a socket connection for recipients with Java mobile information device profile (MIDP) application. Push gateway 115 determines the particular delivery method based on a profile of recipient 120. This profile may be a locally-cached profile or can be obtained from a location register.

There are a number of different ways to implement MMS notification messages that include MMS messages in accordance with exemplary embodiments of the present invention. When the MMS message is relatively small, the header fields defined as optional by the standard can be used to carry the MMS message. These optional fields can include the from, subject, X-Mms-Delivery-Report, X-Mms-Stored, X-Mms-Priority, X-Mms-Reply-Charging, X-Mms-Reply-Charging-Deadline, X-Mms-Reply-Charging-Size, X-Mms-Reply-Charging-ID, X-Mms-Distribution-Indicator, X-Mms-Element-Descriptor, X-Mms-Recommended-Retrieval-Mode, X-Mms-Recommended-Retrieval-Mode-Text, X-Mms-Applic-ID, X-Mms-Reply-Applic-ID, X-Mms-Aux-Applic-Info, X-Mms-Content-Class, X-Mms-DRM-Content and X-Mms-Replace-ID fields. Although specific optional fields are identified, other optional (or mandatory) fields may be employed.

Another technique for implementing MMS notification messages that include MMS messages is to include the MMS message as a payload of the MMS notification message. Because MMS notification messages are comprised of only a header without a payload, this technique reduces the amount of changes required to implement the present invention while allowing the MMS notification message to carry large-sized MMS messages. One of the mandatory and/or optional header fields can be employed to identify that the MMS notification message includes an MMS message.

Figure 3:
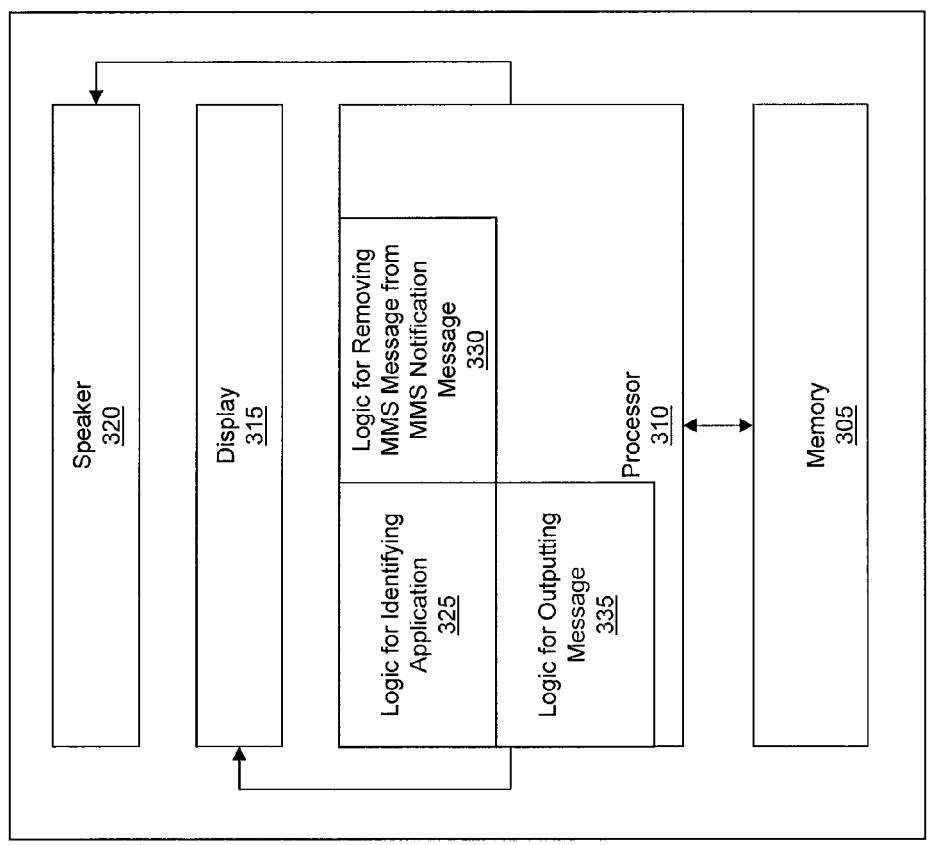
FIG. 3 is a block diagram of an exemplary recipient communication station.

FIG. 3 is a block diagram of an exemplary recipient communication station. The recipient communication station includes memory 305, processor 310, display 315 and speaker 320. Memory 305 can be any type of memory including random access memory, read only memory, volatile memory and/or non-volatile memory. Processor 310 can be any type of processor including a microprocessor, field programmable gate array (FPGA), application specific integrated circuit (ASIC) and/or the like. Processor 310 includes logic 325-335, which will be described in more detail below. When processor 310 is a microprocessor, logic 325-335 can be computer code loaded from memory 305. Display 315 can be any type of display for outputting messages including a liquid crystal display (LCD), plasma display, organic light emitting diode (OLED) and/or the like. Speaker 320 can be any type of speaker capable of outputting audible information including a piezoelectric speaker, moving coil speaker and/or iron magnetic core speaker.

Figure 4:
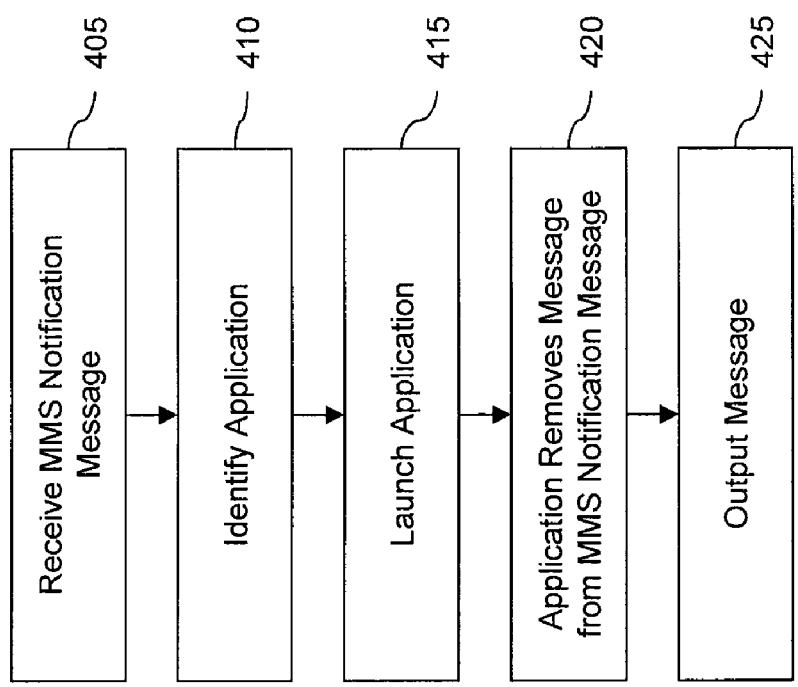
FIG. 4 is a flow diagram of an exemplary method for a recipient communication station in accordance with the present invention.

FIG. 4 is a flow diagram of an exemplary method for a recipient communication station in accordance with the present invention. When an MMS notification message is received (step 405), logic 325 identifies the application associated with the MMS message (step 410). As part of the MMS standard, certain fields in the header such as the X-Mms-Applic-ID field can be employed to identify such an application. The application can be any type of application such as a Java MIDP application, which is not an MMS application. The recipient then launches the identified application (step 415) and logic 330 removes the MMS message from the MMS notification message (step 420). Logic 335 then outputs the message to display 315 and/or speaker 320 in accordance with instructions from the application that opened the MMS message (step 425). In addition, the application can use data in the message to open a web browser and follow a link in the message and/or initiate an interconnect or dispatch call. The application can also be designed to automatically play a ring tone specific to the sender of the message.

Figure 5:
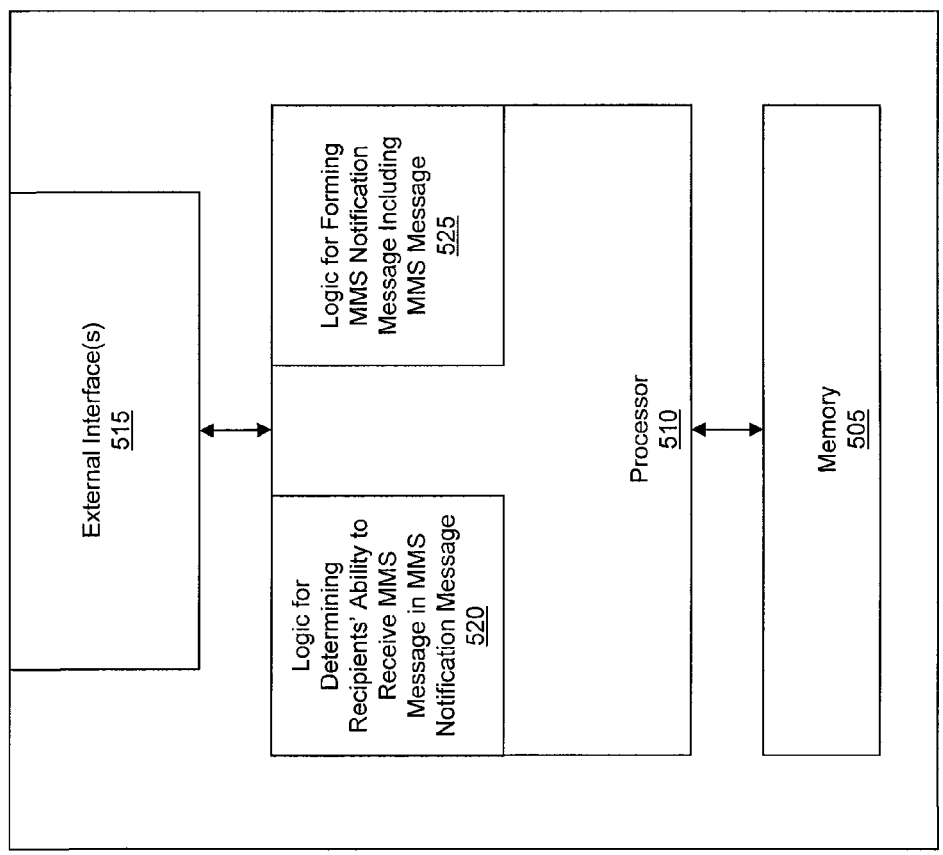
FIG. 5 is a block diagram of an exemplary MMS-C in accordance with the present invention.

FIG. 5 is a block diagram of an exemplary MMS-C in accordance with the present invention. The MMS-C includes memory 505, processor 510 and external interface(s) 515. Memory 505 can be any type of memory including random access memory, read only memory, volatile memory and/or non-volatile memory. Processor 510 can be any type of processor including a microprocessor, field programmable gate array (FPGA), application specific integrated circuit (ASIC) and/or the like. Processor 510 includes logic 520 and 525, which will be described in more detail below in connection with FIG. 6. When processor 510 is a microprocessor, logic 520 and 525 can be computer code loaded from memory 505. External interface(s) 515 can be one or more of the conventional interfaces defined for MMS-Cs, as are well-known in the art.

Figure 6:
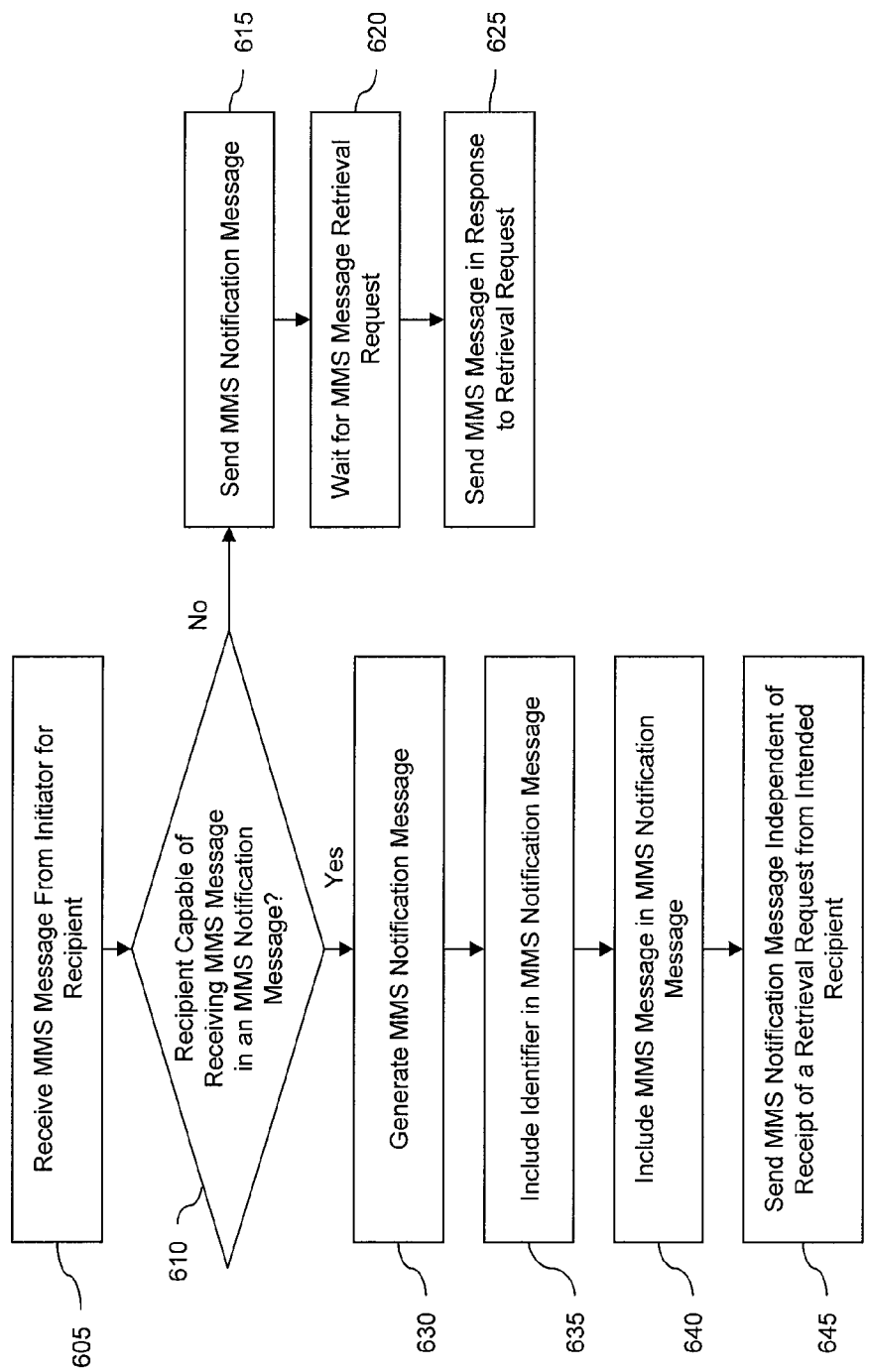
FIG. 6 is a flow diagram of an exemplary method for an MMS-C in accordance with the present invention.

FIG. 6 is a flow diagram of an exemplary method for an MMS-C in accordance with the present invention. When an MMS message is received from an initiator (step 605), logic 520 determines whether the recipient is capable of receiving MMS messages in MMS notification messages (step 610). Logic 520 can make this determination based on locally-cached information, information obtained from a location register, and/or the like. When the MMS notification message that includes the MMS message in the payload portion of the message is employed this step can be omitted because recipients of the message that do not have this capability would simply ignore the payload because they are not expecting it as part of the MMS notification message. When the recipient is not capable of receiving such message ("No" path out of decision step 610), then the MMS message is sent in a conventional manner. Specifically, MMS-C sends an MMS notification message (step 615), waits for a MMS message retrieval request message (step 620) and then sends the MMS message (step 625).

When the recipient is capable of receiving MMS notification messages that include MMS messages ("Yes" path out of decision step 610), then logic 525 generates an MMS notification message (step 630), includes an identifier in the message that indicates that it includes an MMS message (step 635), includes the MMS message as part of the notification message (step 640) and sends the message to the recipient independent of receipt of a retrieval request message from the recipient (step 645). The identifier can be included in any of the mandatory or optional fields, such as the X-Mms-Aux-Applic-Info field.

Although exemplary embodiments have been described in connection with 1-to-1 messages, the present invention is equally applicable to broadcast messages. Additionally, the present invention can be employed to provide voice mail notifications. For example, the message can include either a header identifying it to the recipient communication station as a voice mail notification message (e.g., when the message is sent using other-the-air HTTP) or the message can be sent to a specific IP port to a specific Java client (e.g., when using a Java Push message). In this case, the message originator (i.e., a voice mail system) uses push access protocol (PAP) to directly interface with the push gateway. Although exemplary embodiments have been described in connection with particular message fields and formats, the present invention is equally applicable to other message fields and formats.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for processing a multi-media message (MMS), the method comprising the acts of:
    receiving at a communication station an MMS notification message comprising a header portion and a payload portion, wherein the header portion comprises an identifier in a X-Mms-Aux-Applic-Info field in the header portion of the MMS notification message to indicate that the MMS notification message includes an MMS message and the payload portion comprises the MMS message;
    removing the MMS message from the MMS notification message; and
    outputting the removed message.

2. The method of claim 1, further comprising the acts of:
    determining an application identified in the MMS notification message; and
    initiating the identified application.

3. The method of claim 1, wherein the act of outputting includes the act of:
    outputting audible information.

4. The method of claim 1, wherein the act of outputting includes the act of:
    outputting visible information.

5. The method of claim 4, wherein the visible information is text information.

6. The method of claim 4, wherein the visible information is video information.

7. The method of claim 1, wherein the message is removed from the payload portion of the MMS notification message.

8. The method of claim 1, wherein the message is removed from the header portion of the MMS notification message.

9. A method for processing a multi-media message (MMS), the method comprising the acts of:
    receiving an MMS message;
    determining whether a recipient of the MMS message is capable of receiving MMS notification messages that include MMS messages;
    generating an MMS notification message, including an identifier included in a X-Mms-Aux-Applic-Info field in a header portion of the MMS notification message to indicate that the notification message includes an MMS message; and transmitting the MMS notification message including the MMS message to the recipient when the recipient is capable of receiving MMS notification messages that include MMS messages.

10. The method of claim 9, wherein the MMS message includes information that is reproduced audibly.

11. The method of claim 9, wherein the MMS message includes information that can be reproduced visually.

12. The method of claim 9, wherein the MMS message is included in a payload of the MMS notification message.

13. The method of claim 9, wherein the MMS message is included in a header portion of the MMS notification message.

14. A method for processing a multi-media message (MMS), the method comprising the acts of:

receiving an MMS message;
generating an MMS notification message; and
transmitting the MMS notification message,
wherein the act of generating the MMS notification message includes the acts of generating a header portion of the MMS notification message;
including an identifier in the header portion that the MMS notification message includes an MMS message, wherein the identifier is included in a X-Mms-Aux-Applic-Info field in a header portion of the MMS notification message; and
including the MMS message in a payload portion of the MMS notification message.

* * * * *